United States Patent
Eminger

Patent Number: 5,727,596
Date of Patent: Mar. 17, 1998

[54] CHANGEOVER VALVE

[75] Inventor: Harry E. Eminger, E. Greenwich, R.I.

[73] Assignee: FMC Corporation, Chicago, Ill.

[21] Appl. No.: 805,957

[22] Filed: Feb. 25, 1997

[51] Int. Cl.$^6$ .................................. F16K 11/087
[52] U.S. Cl. ......................... 137/876; 251/180; 251/183
[58] Field of Search .......................... 137/874, 876; 251/180, 181, 183

[56] References Cited

U.S. PATENT DOCUMENTS

| | | | |
|---|---|---|---|
| 1,072,812 | 9/1913 | Bertram | 251/183 X |
| 1,535,212 | 4/1925 | Egloff et al. | 251/183 X |
| 2,893,430 | 7/1959 | Holl | 251/180 X |
| 3,511,471 | 5/1970 | Rossi | 251/180 X |
| 4,262,688 | 4/1981 | Bialkowski | 251/180 X |
| 5,549,138 | 8/1996 | Eminger | 137/876 |

*Primary Examiner*—John Fox
*Attorney, Agent, or Firm*—Ronald C. Kamp

[57] ABSTRACT

A changeover valve which accommodates thermal transients and is operable over a range of temperatures includes a crossover member (20) and a seat assembly (30) in each outlet passage (15), a thrust bearing (45) rotatably supporting the crossover member and a split load ring (40) comprising an inner ring (142) and an outer ring (146) threaded into the changeover valve body. A wave spring (150) is disposed between the inner and outer ring. The loading on the wave spring can be adjusted by the threaded in outer ring, which in turn adjusts the force of engagement of the crossover member against the seat assemblies.

3 Claims, 2 Drawing Sheets

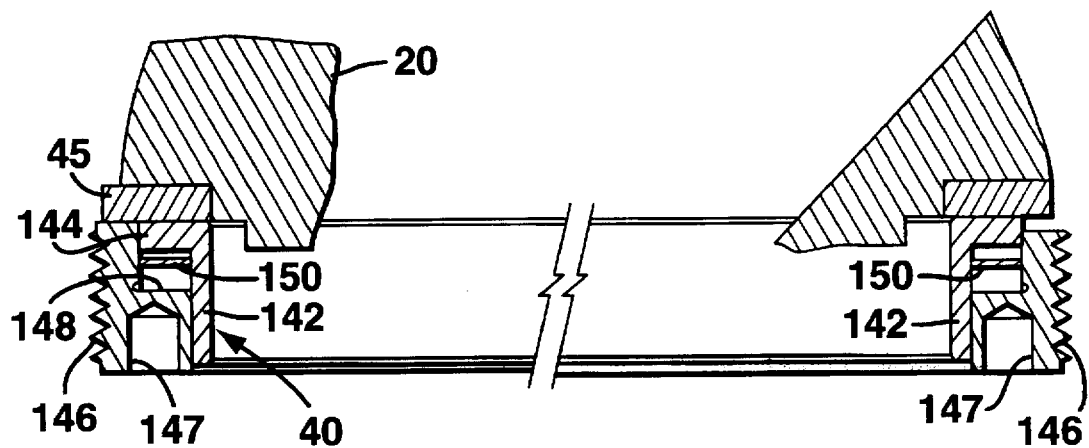
FIG_1
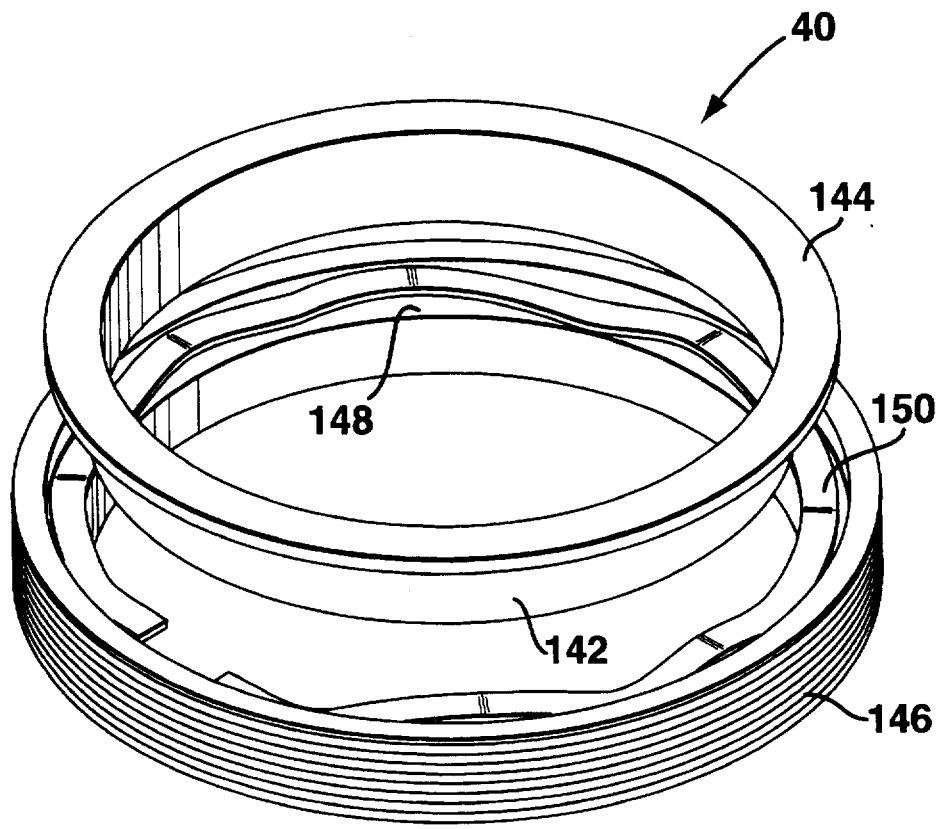
FIG_2

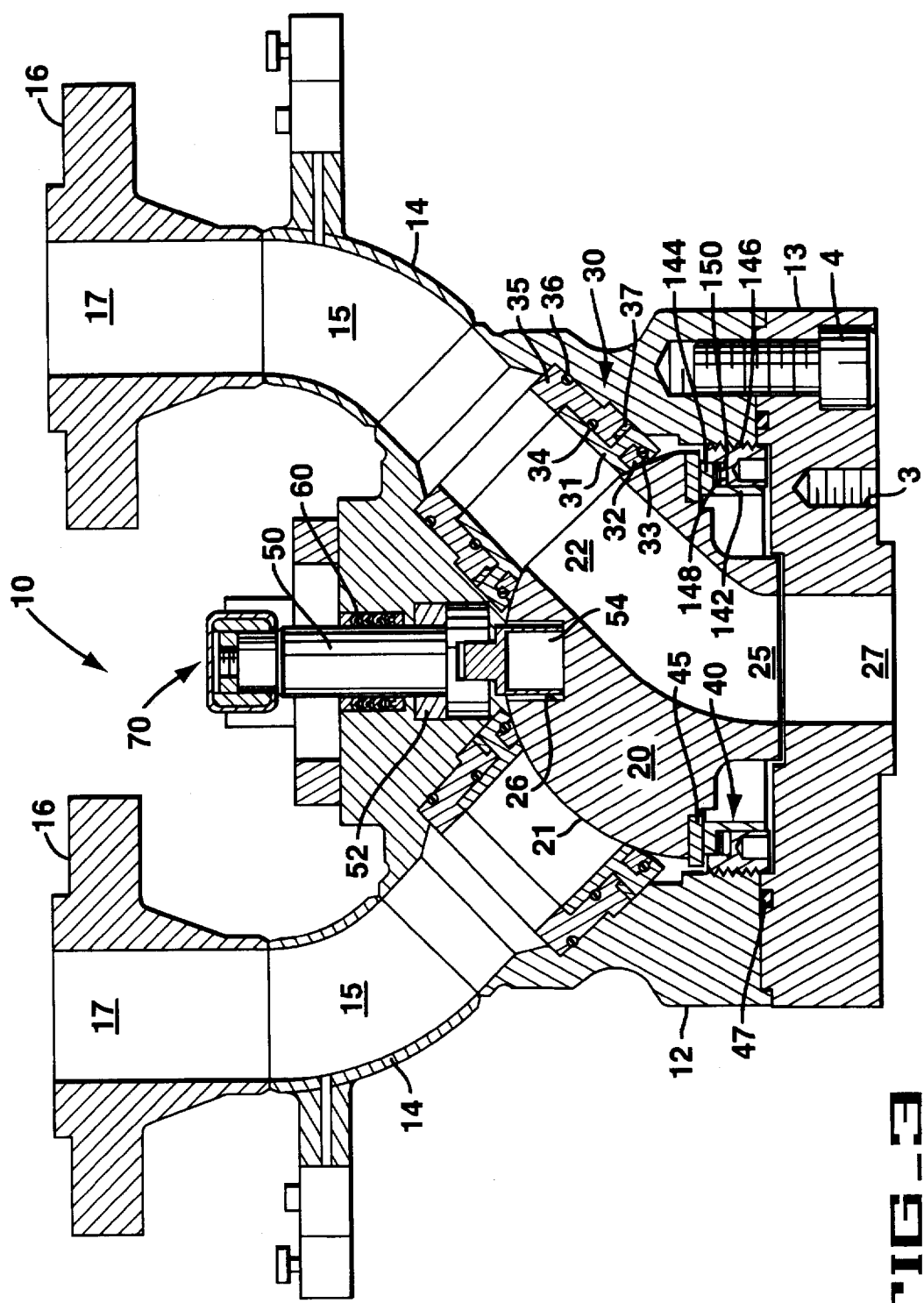
FIG_3

CHANGEOVER VALVE

The present invention relates generally to changeover valves for use with pressurized piping systems, and more specifically, to such valves which permit the transfer of pressure relieving function for such a system between two independent pressure relief devices during operation of the system without interruption of the pressure relieving function, i.e. without isolating the piping system from communication with at least one of the pressure relief devices.

Changeover valves of the prior art have not provided a means for compensation of temperature effect. Such prior art is represented by U.S. Pat. No. 5,549,138, in which a solid annular load ring is threaded into the valve body with a predetermined torque in order to exert the proper seating forces between the spherically shaped crossover member and the seats. The seat load is thus initially set during the assembly of the valve and is determined by the ambient temperature at the time of such assembly. Because the assembled load train is solid, any thermal growth subsequent to assembly will result in a change in the seat load. Such loads can result in higher operating forces, i.e. higher torque required to operate the valve, and if such thermal growth is sufficiently great, can actually damage the seats resulting in failure of the changeover valve. As a consequence, changeover valves of the prior art are inherently confined to a narrow range of operating temperatures at which they are approved for use and an upper limit or maximum temperature to which they may be subjected.

The present invention solves the recited problems of the prior art and provides a changeover valve which accommodates more severe thermal transients, which may be used at higher temperatures, which has a greater range of acceptable operating conditions, which maintains a nearly constant seat load over a wide range of temperature changes, which may be easily retrofitted into existing changeover valves, and which is relatively simple and inexpensive to manufacture, assemble and maintain.

These and other attributes of the present invention, and many of the attendant advantages thereof, will become more readily apparent from perusal of the following description and the accompanying drawings, wherein;

FIG. 1 is a cross-sectional view showing a split load ring according to the present invention;

FIG. 2 is an expanded view of the split load ring shown in FIG. 1; and

FIG. 3 is a cross-sectional view of a changeover valve incorporating the split load ring of FIG. 1.

Referring first to FIG. 3, there is shown a changeover valve, indicated generally at 10, having a valve body 12 to which a bonnet 13 is secured by bolts 4 engageable with blind tapped holes in the body 12. A seal 47 carried by the bonnet 13 engages the bottom of the body 12 to effect a seal therebetween. The bonnet 13 rests upon a riser, not shown, communicating with the pressurized piping system to be protected from over-pressurization and is secured to the riser by bolts extending thorough a flange, provided with conventional seal means similar to seal 47, on the riser and engageable with blind tapped holes 3 in the bonnet 13. A pair of elbows 14 are secured to the body 12 and are each provided with a flange 16 at their respective free end to facilitate attachment of a conventional pressure relief device, not shown. Each elbow 14 and the flange 16 secured thereto define contiguous flow passages 15 and 17 to provide fluid communication to the pressure relief devices mounted on the flanges 16. A crossover member 20 having a spherical outer surface 21 is positioned in the body 12 and is provided with a branched or forked internal passage that defines a pair of independent outlet ports, one of which is shown at 22, and a common inlet port 25, the later port communicating with the riser on the piping system through a bore 27 in the bonnet 13. The body 12 is provided with a pair of bores, each communicating with an associated one of the passages 15 formed by the elbows 14 to provide fluid communication from the interior of the body 12 to the associated passage 15. Each of the bores is counterbored to accept seat assemblies 30, each of which has a seat member 32 mounted in a seat carrier 31, which in turn is mounted in an O-ring carrier 35 received in the counterbore. The seat member 32 is cut, or otherwise formed, with a spherically shaped outer periphery and then lapped on the spherical surface 21 of the crossover member 20 to insure the seat seat member 32 properly conforms to the surface 21, thus enhancing the sealing capability of the seat member 32. An O-ring 33 carried by the seat member 32 prevents leakage around the seat member 32. An O-ring 34 provides a seal between the carriers 31 and 35, and O-ring 36 provides a seal between the carrier 35 and the body 12. A wave spring 37 interposed between the carriers 31 and 35 urges the seat carrier 31 toward the crossover member 20 and thus the seat member 32 into tight engagement with the outer surface of the member 20.

The valve 10 is operated by rotating the member 20 which is achieved by applying a force to a handle assembly 70. ("Operated" as used herein means movement of the valve so that the piping system pressure previously exposed to one of the two pressure relief devices is, after being operated, exposed to the other of such devices.) The handle assembly 70 is shown in cross section in FIG. 3, but projects transverse to the plane thereof. The handle assembly 70 is more fully described in U.S. Pat. No. 5,549,138 and reference may be had thereto for a complete understanding of the handle assembly. The force on the handle assembly 70 applies a torque to a stem 50, the lower end of which is enlarged and slotted to accept a projection on a drive pin 54. The drive pin 54 is complementary to and is engageable with a rectangular recess 26 formed in the crossover member 20. Because the lower end of the stem 50 is subjected to system pressure urging the stem upward, a bearing or thrust washer 52 is interposed between the enlarged end of the stem and the body 12. Conventional packing 60 prevents pressure leakage around the stem 50.

A split load ring, indicated generally at 40 and shown in detail in FIGS. 1 and 2, includes an inner ring 142 having an outward projecting flange 144 and an outer ring 146. The outer periphery of outer ring 146 is threaded to engage a complementary threaded portion of the body 12, with sockets 147 formed in outer ring 146 for engagement by the lugs of a spanner wrench. A shoulder 148 is formed on the outer ring 146 and projects inward. The inner and outer rings thus define a pocket into which compression spring means 150 is positioned. The spring means 150, which preferably is one or more annular wave springs, urges the inner ring 142 upward relative to the outer ring 146. The flange 144 of the inner ring 142 engages a thrust washer 45 interposed between the flange and a flat surface formed on the crossover member 20. The wave spring or springs are selected to provide the required seat load, i.e. the force necessary for proper engagement of the seat members 32 with the spherical surface 21.

The method of assembling the crossover valve 10 is important in order that the spring means 150 apply the load to the seat members 32 that is intended. Before the bonnet 13 is attached, but after the seat assemblies 30 and the stem 50 are inserted into the body 12, the crossover member 20 with the drive member 54 positioned in the recess 26 is inserted into the cavity of body 12. The thrust washer 45 is positioned on the member 20 and the split load ring 40 is threaded into the body 12. The outer ring 146 is tightened by a spanner wrench to a predetermined torque, which torque is to assure the seat load is adequate. This condition is illustrated by the left side of the FIG. 1, wherein the outer ring 146 is directly in contact with the thrust washer 45, thus forcing the member 20 against the seat members 32 with the desired force as a result of the predetermined torque. The outer ring 146 is then loosened by approximately a quarter turn, i.e. the outer ring is rotated to back away from the thrust washer by approximately 90 degrees. This condition is illustrated by the right side of FIG. 1, wherein the outer ring 146 is spaced from the thrust washer 45 and the flange 144 of the inner ring 142 is forced into engagement with the thrust washer 45 by the spring means 150. The amount of deflection to which the spring means 150 is subjected under such condition and the spring constant for the chosen spring means produce substantially the same seat load as the solid connection of outer ring to thrust washer at the predetermined torque. However, the inner ring 142 is capable of axial movement in order to accommodate thermal growth, which can result from either of two distinct types of temperature effects. One such effect is the thermal expansion which results when component parts are made from materials having coefficients of thermal expansion which are not the same. For example, when the valve body 12 is made of carbon steel and the changeover member 20 is made of stainless steel, the changeover member 20 will expand more than the body 12 for any given increase in temperature, because the coefficient of thermal expansion for stainless steel is greater than the coefficient of thermal expansion for carbon steel. In such case, the greater expansion of the crossover member 20 will increase the seat load, i.e. the force exerted on the seat member 32 by the crossover member 20. The other temperature effect is the result of thermal transients which are created when the active relief valve opens permitting hot fluid, e.g. a hot liquid, to flow through the passages 15, 17 connected with the opened relief valve. Even though the valve 10 is connected to the piping system, such connection is typically through a riser, which is filled with stagnant, cooler fluid prior to relief valve opening. The valve 10 is therefore remote and somewhat isolated from the high temperature fluid being routed through the piping system. Consequently, the crossover valve 10 is, prior to opening of the active relief device, at a lower temperature than such fluid. However, when the active relief device opens, the hot fluid from the piping system will immediately begin to flow through the valve 10. The seat assemblies 30 having a relatively small mass will reach an elevated temperature equal, or substantially equal, to the temperature of the hot fluid more quickly than the crossover member 20 and the body 12. Similarly, the member 20 having a smaller mass than the body 12 will become heated more quickly than the body 12. Thus, regardless of whether these component parts of the valve 10 are made of materials having the same or substantially the same coefficients of thermal expansion, they are heated at different rates and thus their thermal growth is not the same at a given point in time during these transient conditions, i.e. until thermal equilibrium is achieved. Under such conditions, the disparity in thermal expansion among these components will also result in increased seat loads.

When the seat loads are increased the operating torque, i.e. the force applied to the handle assembly 70 to cause rotation of the crossover member 20, will also increase making it difficult or, in some cases, impossible to effect movement of the crossover member 20 to switch from one pressure relief device to the other. In addition, when the seat loads become too high, the seat members 32 can be damaged resulting in failure of the valve 10. The spring means 150 will prevent any substantial change in the seat load as a result of temperature effect by accommodating thermal growth. Thus, the valve's operating torque will be relatively unaffected by temperature effects and the seat members 32 protected from damage. The crossover valve 10 is therefore more tolerant of transients of temperature, as well as more tolerant of temperature extremes than the prior art.

While a preferred embodiment of the present invention has been illustrated and described herein, it is to be understood that various changes may be made therein without departing from the spirit of the invention as determined by the scope of the appended claims.

I claim:

1. A crossover valve capable of operation over a wide range of temperatures comprising:

a body having sealing seat means;

a crossover member rotatable within said body and engageable with said seat means;

an outer ring member threadedly engaging said body and having a shoulder;

an inner ring member having a flange overlying said shoulder to define a spring pocket;

a thrust washer interposed between said flange and said crossover member for rotatably supporting said crossover member, compression spring means in said pocket for urging said flange away from said shoulder, and hence said crossover member toward said seat means, with an initial predetermined force; and said inner ring member is free to move axially relative to outer ring member in response to differences in thermal expansion between said body and said crossover member, whereby the load imposed on said seat means is relatively unaffected by changes in temperature throughout said range.

2. The invention according to claim 1, wherein said body and said outer ring member have complementary threads; and said outer ring may be rotated relative to said body to cause said outer ring member to engage said thrust washer and tightened thereagainst with a predetermined torque and thereafter rotated in the opposite direction to space said outer ring member from said washer; and the load on said seat member resulting from application of said predetermined torque is substantially the same as the load on said seat member resulting from the compression spring means after rotation of said outer ring in said opposite direction.

3. A method of assembling a crossover valve having a body with a pair of outlet passages comprising the steps of:

inserting a seal assembly with seat means into each of said outlet passages;

inserting a spherically shaped crossover member into engagement with said seat means;

positioning a thrust washer on said crossover member;

providing a sub-assembly of an outer ring and an inner ring biased apart by spring means;

threading the outer ring of said sub-assembly into said body until a predetermined torque is achieved; and backing the outer ring out of said body a predetermined fraction of a rotation, whereby said spring means maintains a relatively constant load on seat means over a wide range of fluctuations in and extremes of temperature.

* * * * *